UNITED STATES PATENT OFFICE.

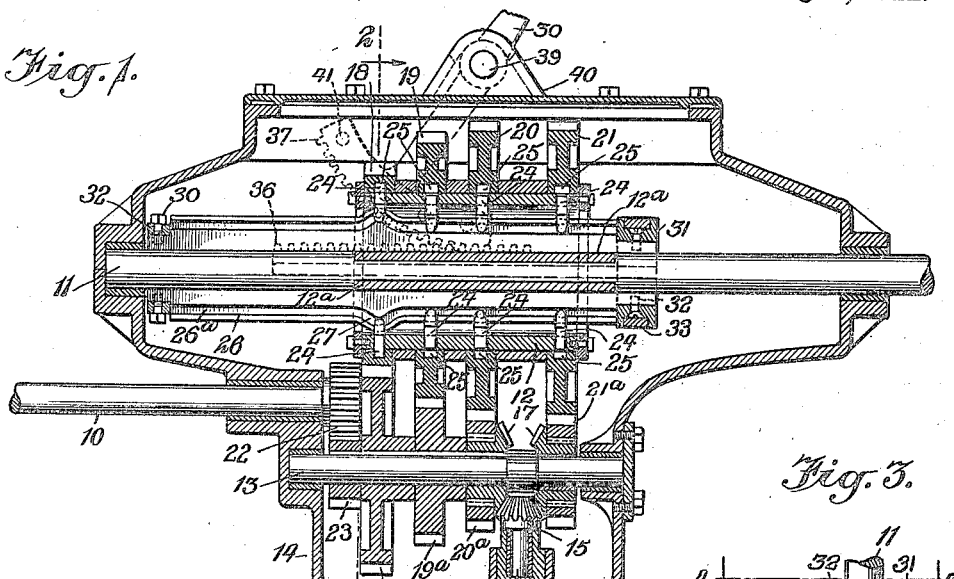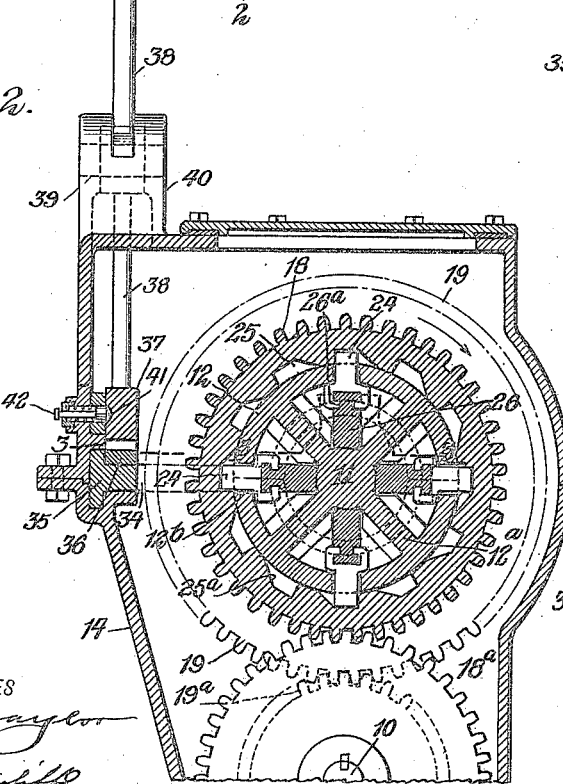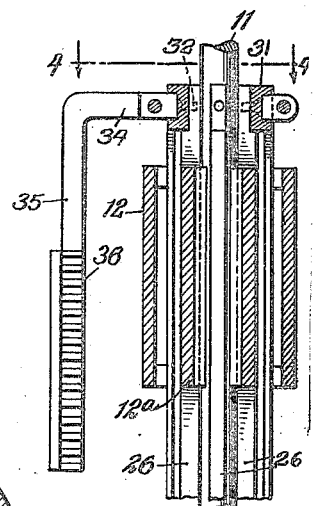

LAWRENCE J. MOBLEY AND ARTHUR V. HAYS, OF SPRINGFIELD, MISSOURI.

TRANSMISSION GEAR.

1,424,208.

Specification of Letters Patent.   Patented Aug. 1, 1922.

Application filed March 17, 1921. Serial No. 453,184.

*To all whom it may concern:*

Be it known that we, LAWRENCE J. MOBLEY and ARTHUR V. HAYS, citizens of the United States, and residents of Springfield, in the county of Greene and State of Missouri, have invented a new and Improved Transmission Gear, of which the following is a description.

Our invention relates to a transmission gear and especially to a transmission gear adapted for installation in an automobile or an auto-truck.

The invention relates more particularly to a transmission gear in which the gear elements provided on the clutch shaft for different speeds are in constant mesh with the corresponding gear elements on the driven or propeller shaft, and in which clutch pins are radially disposed and optionally operable to be caused to selectively lock to the propeller shaft the desired gear element for a particular speed or reverse.

The general object of the invention is to provide a transmission gear improved in various particulars. The distinctive features and advantages of the invention will clearly appear as the description proceeds.

Reference is to be had to the accompanying drawings forming a part of this specification, it being understood that the drawings are merely illustrative of one example of the invention.

Figure 1 is a longitudinal section of a transmission gear embodying our invention;

Figure 2 is a transverse vertical section as indicated by the line 2—2, Figure 2;

Figure 3 is a detail in horizontal section as indicated by the line 3—3, Figure 2, various parts being omitted in the interest of clearness;

Figure 4 is a section on the line 4—4, Figure 3.

In the illustrated example of our invention the numeral 10 indicates the clutch shaft or prime mover; 11, the driven or propeller shaft; 12, a hollow shaft integral or otherwise rigid with the driven shaft 11 and surrounding the same, the character $12^a$ indicating the webs uniting said shafts 11, 12. 13 indicates a counter-shaft; 14, the housing; 15, the bevelled reverse pinion; 16, the stem or shaft of said reverse pinion; and 17, bevel gears at opposite sides of and in mesh with the pinion 15 and forming part of the reversing gear elements. The various shafts referred to have suitable bearings in the housing 14.

Loose on the hollow shaft 12 is a ring gear 18 for high speed, a ring gear 19 for intermediate speed, a ring gear 20 for low speed, and a ring gear 21 for reversing, said gears constantly meshing respectively with gear elements $18^a$, $19^a$, $20^a$ and $21^a$ on the counter-shaft 13, the latter group of gear elements being keyed to said counter-shaft 13 to turn in unison with one another and with one of the bevelled reversing gear elements 17, the other of said reversing gear elements 17 and the reversing gear element 21 being loose on the counter-shaft. The counter-shaft 13 is driven by any suitable means from the clutch shaft 10, there being shown a pinion 22 on said clutch shaft meshing with a pinion 23 on the counter-shaft.

Disposed about the hollow shaft 12 are radial clutch pins 24, there being in the illustrated example four longitudinal series of said pins in quartered positions about said shaft, said pins being adapted to be selectively moved radially outward to project beyond the periphery of the shaft 12 into internal pockets 25 in the respective ring gears 18, 19, 20 and 21. The pins 24 are controlled by a series of actuating bars 26 disposed longitudinally of and between said shafts 11, 12. Said bars 26 are straight throughout except that each bar has a cam formation 27 at one point therein to cause a selected pin 24 to be moved radially outward for throwing in a particular gear element 18, 19, 20 or 21, the remainder of said bars 26 serving to maintain the other pins 24 out of clutching engagement with the ring gear elements other than the one thrown into action. The pins 24 are inter-engaged with the bars 26 to positively actuate the pins for which purpose said bars have longitudinal grooves $26^a$ at the sides giving the bars T-heads in cross section along the outer edges thereof as shown clearly in Figure 2, the pins 24 having corresponding grooves 28 receiving said T-heads. The pins are disposed in and adapted to be projected beyond radial pin holes $12^b$ in shaft 12. The pockets 25 are bevelled at one side as at $25^a$, Figure 2.

In the illustrated example there are four of the bars 26 but the number may be varied. The bars are held in assembled relation at each end, there being in the illustrated example a collar 29 secured to the respective bars by set screws 30. At the opposite end a collar 31 is provided, secured to the respective bars by set screws 32. In an annular groove of the collar 32 is clamped a sectional collar 33 rigid with the lateral bent end 34 of a bar 35 provided with a rack 36 which meshes with a toothed sector 37 on a lever 38 fulcrumed as at 39 on the casing 14 which has a bearing lug 40 for the purpose. With the described arrangement the lever 38 may be rocked to cause the cams 27 of the rods 26 to move a selected pin 24 radially outward through the pin holes $12^b$ and into registering pockets 25 of the selected ring gear 18, 19, 20 or 21. Thus, either the high speed, intermediate, low speed, or reversing ring gear may be clutched by the pins 24 associated therewith.

To lock the clutch lever 38 in position with pins 24 in clutching relation to a given ring element 18, 19, 20 or 21, the sector 37 is formed with spaced depressions 41 at a side face thereof corresponding with the positions of the ring gear elements and to engage in any given depression a spring-pressed pin 42 is provided transversely in the housing 14 and adapted to enter in depressions 41 brought into register therewith.

It will be observed that there is a neutral position for the pins 24 pertaining to each ring gear element and gear clashing or grinding is entirely eliminated in throwing the transmission into or out of a given speed or reverse.

We would state in conclusion that while the illustrated example constitutes a practical embodiment of our invention, we do not limit ourselves strictly to the mechanical details herein illustrated, since manifestly the same can be considerably varied without departure from the spirit of the invention as defined in the appended claims.

Having thus described our invention, we claim:

1. A transmission gear including a drive shaft having gear elements varying in size, a driven shaft, ring gears of varying size loose on the driven shaft and in constant mesh respectively with the corresponding gear elements on the drive shaft, pins radially disposed on the driven shaft and normally within the periphery thereof, the inner ends of the pins being bent laterally, and operating bars having grooved sides, the grooves being straight for their major portions and having an outwardly curved portion thereon at a given point, the bent ends of the pins being accommodated in the grooves of the bars.

2. A transmission gear including a drive shaft having gear elements varying in size, a driven shaft, ring gears of varying size loose on the driven shaft and in constant mesh respectively with the corresponding gear elements on the drive shaft, pins radially disposed on the driven shaft and normally within the periphery thereof, a plurality of longitudinal bars disposed within the driven shaft, collars connecting the bars at their ends, a reciprocating element connected with one of said collars for shifting the bars longitudinally, said element having a rack thereon, and a sector lever engaging said bar, said lever having a series of depressions spaced to correspond with the ring gears and there being a spring-pressed pin adapted to engage in the respective depressions.

LAWRENCE J. MOBLEY.
ARTHUR V. HAYS.